US005731989A

United States Patent [19]

Tenny et al.

[11] Patent Number: 5,731,989

[45] Date of Patent: Mar. 24, 1998

[54] METHOD AND DEVICE FOR DETERMINING A MEASUREMENT FOR COLOR CONTROL IN A PRINTING PROCESS

[75] Inventors: Roy Tenny, Ramat Hasharon; Noam Noy, Smilatzki; Michael D. Goldstein, Herzlia, all of Israel

[73] Assignee: Advance Vision Technology (A.V.T.) Ltd., Herzlia, Israel

[21] Appl. No.: 635,186

[22] Filed: Apr. 25, 1996

[51] Int. Cl.[6] .......... H04N 1/46

[52] U.S. Cl. .......... 364/526; 358/406; 358/504

[58] Field of Search .......... 364/526; 358/406, 358/504, 518, 522, 296, 298, 401, 520; 356/402, 405, 406, 408; 101/171, 211, 483; 395/131; 382/108, 157, 160

[56] References Cited

U.S. PATENT DOCUMENTS

| | | | |
|---|---|---|---|
| 4,664,496 | 5/1987 | Ott | 364/526 |
| 4,671,661 | 6/1987 | Ott | 356/402 |
| 4,958,221 | 9/1990 | Tsuboi et al. | 358/80 |
| 5,141,323 | 8/1992 | Kipphan et al. | 356/406 |
| 5,182,721 | 1/1993 | Kipphan et al. | 364/526 |
| 5,416,613 | 5/1995 | Rolleston et al. | 358/518 |
| 5,450,165 | 9/1995 | Henderson | 355/208 |
| 5,493,321 | 2/1996 | Zwadlo | 347/131 |

OTHER PUBLICATIONS

Tou, J. et al, "Pattern Recognition Principles", Addison–Wesley Pub. Co., Inc., (1974) pp. 90–107.

Young, T.Y. et al, "Handbook of Pattern Recognition and Image Processing", Academic Press, Inc., (1986) Chap. 2 (Anil K. Jain) pp. 33–57.

Jain, A.K., "Fundamentals of Digital Image Processing", Prentice–Hall, (1989) pp. 62–74.

*Primary Examiner*—James P. Trammell
*Assistant Examiner*—Tony M. Cole
*Attorney, Agent, or Firm*—Mark M. Friedman

[57] ABSTRACT

A method and a device for evaluating a printing process, which can be used for determining a measurement to be exercised for controlling the printing process. The method comprising the steps of calculating a multidimensional data representation of a reference image, and clustering the multidimensional data representation into at least one cluster of data according to at least one multidimensional clustering algorithm. The device comprising calculating means for calculating a multidimensional data representation of a reference image and clustering means for clustering the multidimensional data representation into at least one cluster of data according to at least one multidimensional clustering algorithm. Each of the clusters of data serves for determining at least one feature of measurement of the reference image. The features of measurement serve for selecting at least one type of physical measurement to be performed on a printed image. Whereas, the physical measurements serve for a color based control of the printing process of the printed image.

34 Claims, 4 Drawing Sheets

METHOD AND DEVICE FOR DETERMINING A MEASUREMENT FOR COLOR CONTROL IN A PRINTING PROCESS

FIELD AND BACKGROUND OF THE INVENTION

The present invention relates in general to a method and device for evaluating a printing process. More particularly, the present invention relates to a method and device for determining a measurement to be exercised for color control in the printing process.

In printing systems such as flexo, gravure, offset, digital printers, laser printers and the like, a common technique for monitoring the quality of colors in prints is to artificially create test patch(es) or stripe(s) of predetermined color(s), i.e., color marks, in the margin of the pits, or between successive prints. The actual color obtained during the printing process in the test patches can then be monitored using any suitable optical instrument aimed at color detection such as colorimeters, spectrophotometers and the like, or even densitometers in simple cases where only the density (i.e., value, intensity) of color is to be monitored.

Such approaches for color control of printing processes are typically exercised off-line, wherein large color marks printed in the margins of prints are monitored using optical instruments having a medium to low optical head positioning accuracy. Such approaches are described for example in U.S. Pat. Nos. 5,141,323 and 5,182,721 to Kipphan et al.; and 4,671,661 to Ott.

Such approaches suffer limitations due to the wasteful use of printing raw materials, inaccuracy since the color marks do not represent the color content of the print and limitations associated with working off-line.

In order to enable on-line color monitoring, instruments for color detection having high accuracy optical head positioning capabilities were developed and used for on-line monitoring of color marks. Furthermore, instruments capable of monitoring intrinsic print color component(s), which instruments are aimed at high accuracy on-line color monitoring were also developed. Such an instrument is for example the PV 9000 by Advanced Vision Technology (A.V.T.) Ltd., 16 Galgaley haplada St., 46120 Herzlia, Israel, capable of locking its optical head on a specific print component and of correlating between the print component and a predetermined reference for on-line color monitoring during a printing process.

U.S. Pat. No. 5,450,165 to Henderson discloses a system for identifying areas in pre-existing image data as test patches for print quality measurement. The system described therein is used to screen for printing data consistent with an area in a visible image having predetermined density condition, and thereafter to determine the visible image density in the area having the preselected density condition. The actual determination of image density is by densitometer(s), installed in the printing machine and is limited to fairly large patches having rectangular dimensions.

The present invention concerns an innovative approach of determining a feature of measurement for selecting a physical measurement to be performed on a printed image, for a color based control of a printing process.

SUMMARY OF THE INVENTION

According to the present invention there are provided a method and a device for evaluating a printing process, which can be used for determining a measurement to be exercised for controlling the printing process.

According to further features in preferred embodiments of the invention described below, the method comprising the steps of calculating a multidimensional data representation of a reference image; and clustering the multidimensional data representation into at least one cluster of data according to at least one multidimensional clustering algorithm. Each of the clusters of data serves for determining at least one feature of measurement of the reference image. The features of measurement serve for selecting at least one type of physical measurement to be performed on a printed image. Whereas, the physical measurements serve for a color based control of the printing process of the printed image.

According to still further features in the described preferred embodiments the method further comprising the steps of performing the physical measurement for obtaining at least one physical measure of the printed image and determining whether the physical measure(s) fall within a predetermined range.

According to still further features in the described preferred embodiments the method further comprising the step of adjusting the printing process if and when the physical measure is out of the predetermined range and optionally actuating an alarm signal and/or recording the physical measure for producing a report.

According to still further features in the described preferred embodiments the method further comprising the step of communicating the feature of measurement to a distant printing station.

According to still further features in the described preferred embodiments provided is a device for effecting the above method, the device comprising calculating means for calculating a multidimensional data representation of a reference image and clustering means for clustering the multidimensional data representation into at least one cluster of data according to at least one multidimensional clustering algorithm. Each of the clusters of data serves for determining at least one feature of measurement of the reference image. The features of measurement serve for selecting at least one type of physical measurement to be performed on a printed image. The physical measurements serves for a color based control of the printing process of the printed image.

According to still further features in the described preferred embodiments the device further comprising a measuring apparatus for performing the at least one type of physical measurement for obtaining at least one physical measure of the printed image and for determining whether the physical measure fails within a predetermined range.

According to still further features in the described preferred embodiments the device further comprising a feedback system for adjusting the printing process if the physical measure is out of the predetermined range. Preferably the device further comprising an alarm system for actuating an alarm signal if the physical measure is out of the predetermined range. Optionally, the device further comprising a recording system for recording the physical measure for producing a report and/or communication means for communicating the feature of measurement to a distant printing station.

The present invention successfully addresses the shortcomings of the presently known configurations by providing a method and device for determining a measurement to be exercised for control of a printing process, which method and device are directed at defining feature of measurements in an inventive way never proposed before, which way is highly versatile, employing multiple dimensions defining printed images and are therefore applicable for numerous applications.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of a method and device for evaluating a printing process which can be used for determining a measurement to be exercised for control of the printing process. Specifically the present invention can be used for determining a physical measurement performed on a printed image during or after the printing process. The invention can be exercised for color control of the printing process. The measurement is performed within the image and is not limited to pre determined patches of any particular size and/or shape, thus, control can be performed also in cases where no such patches exists.

The principles and operation of a method and device according to the present invention may be better understood with reference to the drawings and accompanying descriptions.

The method and device according to the present invention are directed at providing a feature of measurement regarding an image for dictating (i.e., determining) a physical measurement of the image, itself used for color based control of the printing process employed for printing the image.

Figure 1:
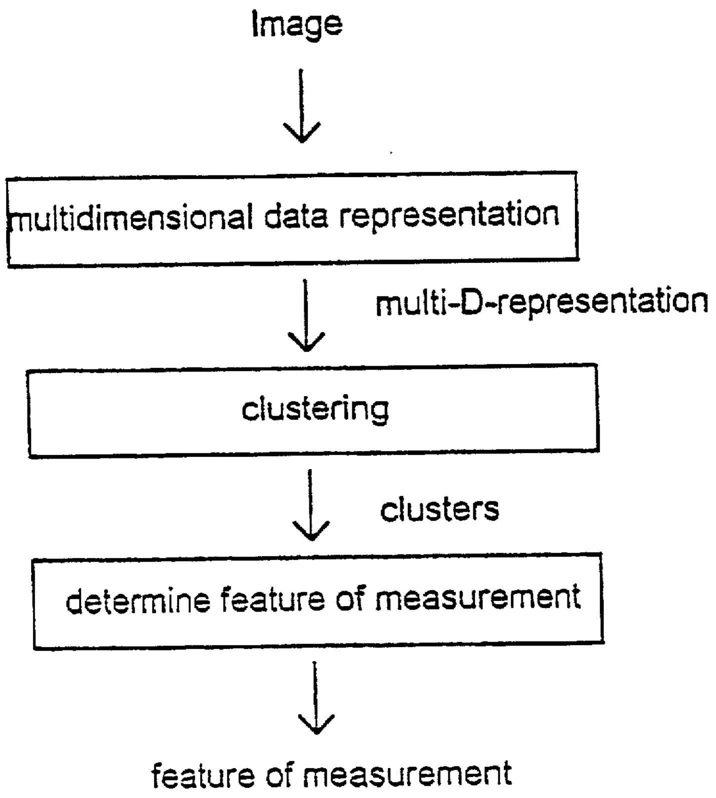
FIG. 1 is a flow diagram of determining a feature of measurement according to the present invention.

With reference now to FIG. 1, providing the feature of measurement according to the present invention is by (a) calculating a multidimensional data representation of the image; and (b) clustering the multidimensional data representation of the image into at least one cluster of data according to a multidimensional clustering algorithm, wherein the clusters of data are for determining the feature of measurement for the image. The determined feature of measurement may thereafter be used for selecting a physical measurement to be performed on the image and used for a color based control of the printing process employed to print the image.

The term multidimensional data representation as used herein refers to a set of data representing a combination of dimensions associated with printing.

Thus, as images typically have spatial dimensions, a first and a second spatial dimensions such as but not limited to X and Y dimensions of the Cartesian coordinates system or R and θ of the Polar coordinates system, and the like, may be used as dimensions.

As color images include colors, each color may be used as an additional dimension. For example an RGB image includes three colors, red, green and blue, each of which can be employed as a single color dimension. Additional examples of colors used in printed images are CMY (cyan, magenta and yellow), typically combined with black (CMYK), L*a*b*, LUV and XYZ. Further description of these color systems may be found in text books related to the art of printing. One example is A. K. Jain (1989) Fundamentals of digital image processing. Prentice Hall, Englewood Cliffs, N.J. 06732, which is incorporated by reference as if fully set forth herein.

Each of the above colors, or colors attributed to any other spectral description employed in printing processes, may be used as a color dimension for the multidimensional data representation, depending of course on the specific printing application.

Yet, as some printed images, such as for example holograms, include additional information which is the angle in which the hologram is observed at, in these cases spatial dimensions (such as X and Y) may be insufficient for describing a measurement and an additional dimension is to be used for multidimensional data representation - an angle dimension, which describes the angle at which the image (e.g., hologram) is observed at.

Most printing processes are repetitive in nature, therefore a time dimension may also be employed for multidimensional data representation, enabling control of the printing process over time.

For simplicity, further examples will consist of various combinations of dimensions selected from the X and Y spatial dimensions and red (R), green (G) and blue (B) color dimensions of the RGB color system.

In a preferred embodiment the multidimensional data representation is effected by creating a multidimensional histogram. Consider for example an RGB image. Such an image may be presented as a 5-dimensional (i.e., 5D) histogram having two spatial and three color dimensions, i.e., X and Y and R, G and B, respectively. For other applications some of the color or spatial dimensions may be disregarded and a 4D, 3D or even 2D histograms may be selected.

Given a typical image size of 512×768 pixels, where each pixel is attributed a single RGB color value, typically ranging in intensity between 0 and 255, the histogram requires $512\times768\times(256^3)=6.6e^{12}$ individual cells forming a binary histogram (i.e., each of the cells is attributed a value selected from zero and one). Therefore, quantization is preferably performed in all/some of the histogram dimensions, to obtain a non-binary histogram, to lower the amount of computer memory required to store the data and to lower the amount of time required for computer processing.

One example of quantization may be having X and/or Y dimensions given in groups of 10 pixels resolution, and/or having one or more of the RGB color dimensions given in 10 gray level steps.

Furthermore, a small portion of the image may be used to create the histogram instead of using the entire image. In all cases the histogram is calculated by assigning each cell within the histogram the number of pixels within the original image, which falls within the cell's XYRGB coordinates, after quantization.

Likewise a 4D histogram may be created using for example only the XKGB dimensions. In this case the histogram depends only on X spatial dimension, therefore histogram values correspond to stripes along the Y spatial dimension. Hence, in this case the X dimension may be quantized to match operation zones of various inking adjusting means used in various presses (e.g., ink-keys used in offset presses), and thus to regulate each of the inking adjusting means within its corresponding printing zone.

It will be appreciated by one ordinarily skilled in the art that any other combination of at least two dimensions may be similarly used for histograming as described.

In cases where the spatial and/or color resolutions are less than as described above, multidimensional data representation may be selected as a multidimensional binary function such as f(X,Y,R,G,B), etc., for obtaining a binary histogram. In this case no quantization as described above is required.

In a preferred embodiment clustering the multidimensional data representation, e.g., creating the multidimensional histogram, into clusters of data is effected by a multidimensional clustering weighting function such as for example a window clustering function, which has a predetermined range in each of the dimensions used, the clustering is effected according to at least one rule.

The predetermined range in any of the dimensions may be selected to be tolerances (i.e., deviations) from desired nominal measurements of color values and/or spatial values. Tolerances may be selected maximal or minimal for any of the spatial and/or color dimensions.

As far as color dimensions are of concern, any user defined distance between two spectrum functions, such as correlation coefficient, sum of squares of difference between spectrum corresponding components or any other distance function known in the art, may be used to determine the predetermined range in any of the color dimensions.

Figure 2:
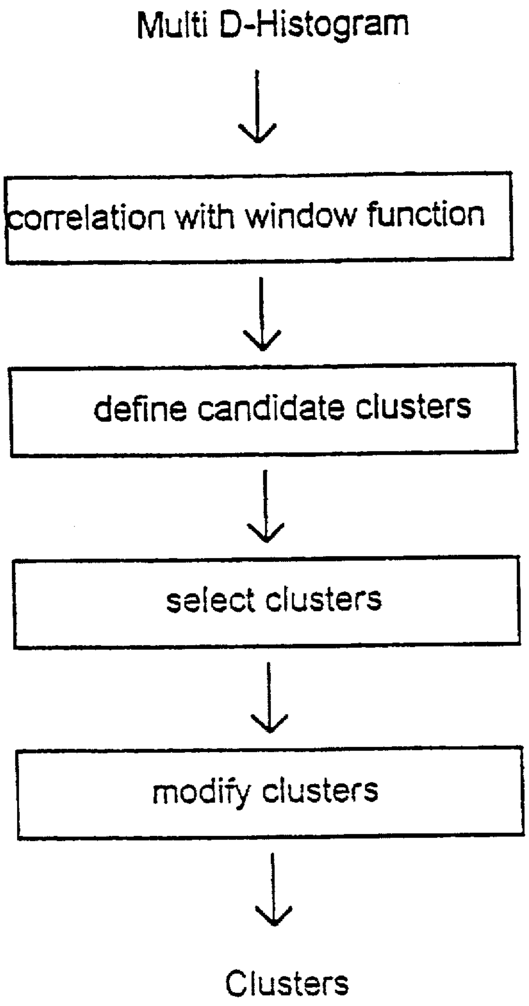
FIG. 2 is a flow diagram of a preferred clustering algorithm according to the present invention.

With reference now to FIG. 2, presented is a flow diagram of a preferred clustering algorithm according to the present invention. Preferred clustering steps are boxed. As shown in FIG. 2, the input to the preferred clustering algorithm is a multidimensional histogram, e.g., a 5D-(X,Y,R,G,B)-histogram (equation 1):

$$H(X,Y,R,G,B) \tag{1}$$

The window function employed for clustering may acquire a form of any shape, such as but not limited to a sphere, an ellipsoid, a cylinder, a hyper cube, a multidimensional exponential decaying window, etc., and is defined herein as (equation 2):

$$W(X,Y,R,G,B) \tag{2}$$

A preferred example of a 5D window is given in equation 3:

$$W(X,Y,R,G,B) = C \cdot e^{\frac{1}{2}\left[\frac{X^2}{T_X} + \frac{Y^2}{T_Y} + \frac{R^2}{T_R} + \frac{G^2}{T_G} + \frac{B^2}{T_B}\right]} \tag{3}$$

wherein, C is a constant and $T_X$, $T_Y$, $T_R$, $T_G$ and $T_B$ determine the allowable deviation of cluster component values from the cluster's central value.

After selecting a suitable window function, a correlation with the window function is performed according to equation 4:

$$\Gamma(X,Y,R,G,B) = \sum_{X'}\sum_{Y'}\sum_{R'}\sum_{G'}\sum_{B'} H(X',Y',R',G',B') \cdot W(X-X', Y-Y', R-R', G-G', B-B') \tag{4}$$

wherein Γ(X,Y,R,G,B) is the correlation and X', Y', R', G', B' are all possible dimension coordinates of the cells of the histogram.

After correlation as described above is completed, candidate clusters are determined. Given the correlation Γ(X, Y, R, G, B) calculated according to equation 4 in the previous stage, maximum values are located in Γ(X, Y, R, G, B), such that each of the maximum values is above a predetermined threshold value.

Maximum values serve as cluster centers. Pixels of the image may be selected as members in a cluster by choosing the image pixels contained within a multidimensional hyper cube, ellipsoid or any other multidimensional volume centered at the cluster's center, or by a propagation process from the center of cluster to neighboring pixels according to any connectivity rule.

Thus, for example, high allowable deviations in the spatial dimensions X and Y (i.e., $T_X$ and $T_Y$ selected having high values) and low allowable deviations in the color dimensions R, G and B (i.e., $T_R$, $T_G$ and $T_B$ selected having low values) would result in clusters of strictly defined KGB color values, which have nonstricted spatial shapes.

High allowable deviation in the first spatial dimension Y (i.e., $T_Y$ selected having a high value) and low allowable deviations in the second spatial dimension X (i.e., $T_X$ selected having a low value) and in the color dimensions R, G and B (i.e., $T_R$, $T_G$ and $T_B$ selected having low values) would result in clusters of strictly defined KGB color values which corresponds to strips along the Y axis. Strips width is controlled by the size of $T_X$, to match strips of print corresponding to zones of different inking adjusting means.

High allowable deviation in the spatial dimensions X and Y and color dimensions R and G, and low allowable deviations in the third color dimension B would result in clusters of non-strict shape, and strictly defined blue component. These clusters may be used to examine blue surfaces.

High allowable deviations in the spatial dimensions X and Y and the color dimension R, and low allowable deviations in the color dimensions G and B, would result in clusters of non-strict shape, and strictly defined blue and green components. These clusters may be used to regulate a Cyan (Blue+Green) component during printing.

It will be appreciated by one ordinarily skilled in the art that other combinations of high and low allowable deviations both in spatial and in color dimensions may be used for various other applications.

After determining candidate clusters as described above, specific clusters are selected as follows. From the group of candidate clusters, clusters are selected according to any desirable rule(s), such as for example but not limited to: (i) the total number of clusters; (ii) number of pixels in clusters; (iii) preferred color of clusters; (iv) preferred locations of clusters, e.g., clusters located in the center of the image, clusters with locations corresponding to strip(s) of inking adjusting means, etc.; (v) clusters spread in multidimensional space.

In a preferred embodiment, the spread of clusters is determined according to equations 5 and 6:

$$S \overset{\Delta}{=} \sum_{C_i}\sum_{C_j} D^2(C_iC_j), \text{ wherein } C_iC_j \in \left\{\begin{matrix}\text{candidate}\\ \text{clusters}\end{matrix}\right\} \tag{5}$$

$$D_{c_i c_j} \overset{\Delta}{=} \frac{(\hat{X}_i - \hat{X}_j)^2}{K_X} + \frac{(\hat{Y}_i - \hat{Y}_j)^2}{K_Y} + \frac{(\hat{R}_i - \hat{R}_j)^2}{K_R} + \frac{(\hat{G}_i - \hat{G}_j)^2}{K_G} + \frac{(\hat{B}_i - \hat{B}_j)^2}{K_B} \tag{6}$$

wherein, S is the spread of the clusters, $K_X$, $K_Y$, $K_R$, $K_G$ and $K_B$ are selected by a user and define a desired distance between clusters in each of the X, Y, R, G and B dimensions, respectively, and $\hat{X}$, $\hat{Y}$, $\hat{R}$, $\hat{G}$ and $\hat{B}$ are the cluster centers or alternatively the mean values of the clusters in each of the X, Y, R, G and B dimensions, respectively, and D is the distance between the two clusters, $C_i$ and $C_j$.

In the later case (i.e., v above), $K_R$, $K_G$ and $K_B$ are used to control clusters spread demands, wherein selecting $K_R$, $K_G$ and $K_B$ having high values and selecting $K_X$ and $K_Y$ having low values would result in clusters spatially located far from each other, whereas selecting $K_R$, $K_G$ and $K_B$ having low values and selecting $K_X$ and $K_Y$ having high values would result in clusters which tend to be distant from each other in the RGB dimensions and therefore cover most of RGB color space, rather than a certain color.

After selecting specific clusters as described above, selected clusters are modified in one of many ways as follows. For example clusters modification may involve (i) selecting those pixels which fulfill a connectivity constraint (i.e., eliminating isolated pixels); (ii) choosing those pixels in a cluster which are at least a minimal distance away from the surface of the 5D cluster for enabling color homogeneity inspection in for example pixels which are distant from varying color areas; (iii) choosing those pixels in a cluster near the surface of the 5D cluster for enabling registration control, which is more easily detectable in color varyinglocations. In fact, any other morphological, logical, mathematical calculation or algorithm may be used to modify clusters.

As will be appreciated by one ordinarily skilled in the art, other algorithms may be used for clustering. These include algorithms such as but not limited to a simple cluster seeking algorithm, a maximin distance algorithm, a K-means algorithm and an isodata algorithm, all as described in J. T. Tou and R. C. Gonzalez (1974) Pattern recognition principles. Addison-Wesley publishing company, Reading Mass. pp. 75–108, which is incorporated by reference as if fully set forth herein, and clustering algorithms described in T. Y. Young and K. S. Fu (1986) Handbook of pattern recognition and image processing. Academic Press Inc. San Diego Calif., pp. 33–57, which is incorporated by reference as if fully set forth herein.

As mentioned above, the method according to the present invention is directed at providing a feature of measurement regarding an image for color based control of the printing process employed for printing the image, wherein providing the feature of measurement is by calculating a multidimensional data representation of the image (e.g., by histograming), clustering the multidimensional data representation of the image into at least one cluster of data according to a multidimensional clustering algorithm and using the clusters of data for determining the feature of measurement of the image.

The term feature of measurement as used herein in this document and especially in the claims section below refers to a description of any type of actual (i.e., physical measurement) that can be or is performed on an image. Basically two types of measurements can be performed on an image for color control, these include (i) a measurement for determining the presence and value of at least one color in at least one given location in the image; and (ii) a measurement for determining at least one location of at least one given color in the image, according to the first option a location is given and the measurement is of a color, whereas according to the second, a color is determined and the measurement is of a location. As is clear to one skilled in the art, the first option is more prominent for color control.

Examples of feature of measurements according to the present invention include but are not limited to (i) desired measurement of color(s) and/or color(s) tolerance(s); (ii) measurement of location(s) and/or location(s) tolerance(s); (iii) a suggested sequence of measurements of locations and/or colors; (iv) randomization of sequence of measurements of locations.

An example of providing a feature of measurement using a single 5D(XYRGB) cluster includes: (i) taking a desired nominal color value as the average color value of cells within the cluster; (ii) taking the tolerance for the desired nominal color value as the standard deviation of the color value, of the cells within the cluster, from the desired nominal color value; (iii) repeatedly taking measurement of locations as the spatial (i.e., X, Y) coordinates of histogram cells within the cluster, wherein cells are randomly selected from the group of histogram cells within the cluster.

A similar process may be applied to a group of clusters. For example, where each cluster corresponds to a different color value, one can use clusters consecutively in order to examine different colors of interest at random locations.

The physical measurement may be the spectrum of reflected illumination as determined by a spectrometer, the density as determined by a densitometer; the color as determined by a colorimeter; or color and density in respect to spatial locations as determined by acquiring an image using a camera (e.g., array CCD, line CCD, etc.).

The method according to the present invention is directed at providing a feature of measurement regarding an image for color based control of the printing process employed for printing the image. The determined feature of measurement may thereafter be used for selecting a physical measurement to be performed on the image and used for a color based control of the printing process employed to print the image.

Thus, further according to the method of the present invention a physical measurement for obtaining a physical measure of the image is performed. In addition, a determination whether the measured physical measure is within a predetermined range is made. This determination may be used for various purposes such as for example (i) adjusting the printing process if the physical measure is out of the predetermined range; (ii) actuating an alarm signal if the physical measure is out of the predetermined range; (iii) recording the physical measure for producing a printing quality report.

In a preferred embodiment the method according to the present invention includes (a) calculating a multidimensional data representation of a reference image; and (b) clustering the multidimensional data representation into at least one cluster of data according to at least one multidimensional clustering algorithm. Each of the at least one clusters of data is for determining at least one feature of measurement of the reference image for selecting at least one type of physical measurement to be performed on a printed image for a color based control of the printing process of the printed image.

The reference image and/or the printed image may be a digital image corresponding to a printed substrate. Source of the reference image may be a prepress image, an image acquired during start of press, an image acquired any time during press, a digital image supplied trough network, disk, reference image may be created using array CCD camera, linear CCD camera, or created using any computing means, such as but not limited to a computer, e.g., the international business machine by IBM or a compatible personal computer having a CPU such as the Intel pentium pro CPU. In another embodiment the reference image and the printed image are a single image.

In a preferred embodiment, the feature of measurement may be communicated to a distant printing station, via any data communication means such as, but not limited to electronic mail (Email). This would assist for example in the news paper industry, since in many cases printing is performed in a distant country.

Figure 3:
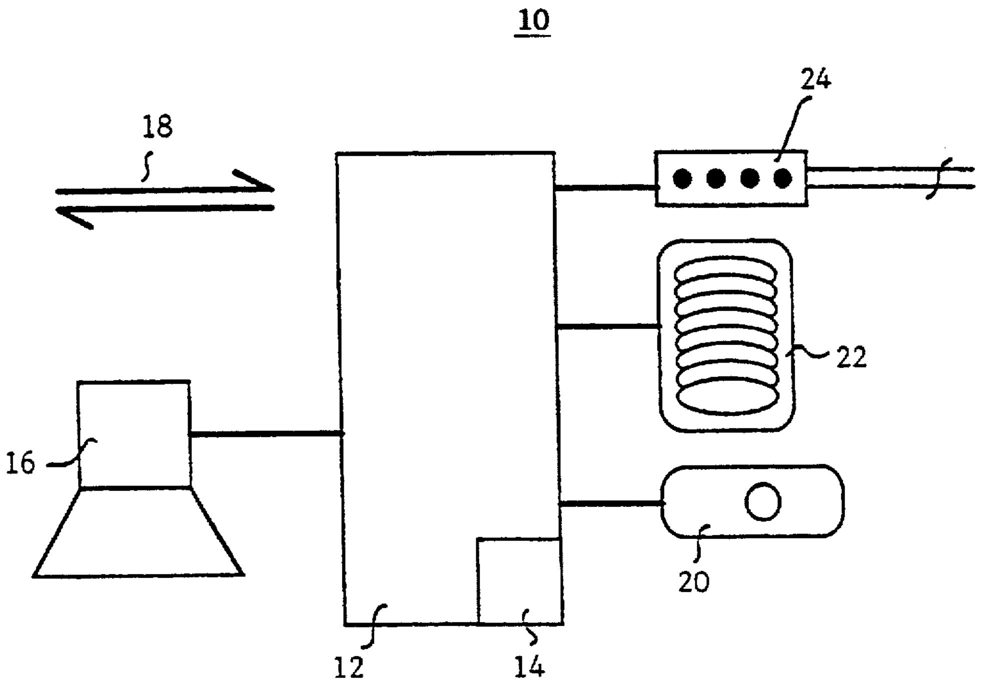
FIG. 3 is a device according to the present invention.

With reference now to FIG. 3, further according to the invention provided is a device for effecting the various embodiments of the method described hereinabove. The device, generally referred to as device 10 is for evaluating a printing process, and includes (a) calculating means 12 for calculating a multidimensional data representation of a reference image; and (b) clustering means 14 for clustering the multidimensional data representation into at least one cluster of data according to at least one multidimensional clustering algorithm, each of the at least one clusters of data being for determining at least one feature of measurement of the reference image, the at least one feature of measurement being for selecting at least one type of physical measurement to be performed on a printed image, the at least one type of physical measurement being for a color based control of the printing process of the printed image.

According to a preferred embodiment, device 10 further includes a measuring apparatus 16 for performing the at least one type of physical measurement for obtaining at least one physical measure of the printed image and for determining whether the at least one physical measure being within a predetermined range. Measuring apparatus 16 may be of any suitable type including a spectrophotometer, densitometer, colorimeter and a camera, all used as described above.

According to another preferred embodiment, device 10 further includes a feedback system, as indicated in FIG. 3 by arrows 18, for adjusting the printing process if the at least one physical measure is out of the predetermined range.

According to yet another preferred embodiment, device 10 further includes an alarm system 20 for actuating an alarm signal (e.g., a sound and/or light alarm signal) if the at least one physical measure is out of the predetermined range.

According to yet another preferred embodiment, device 10 further includes a recording system 22 for recording the physical measure for producing a report.

According to yet another preferred embodiment, device 10 further includes communication means 24 for communicating the feature of measurement to a distant printing station.

While the invention has been described with respect to a limited number of embodiments, it will be appreciated that many variations, modifications and other applications of the invention may be made.

Reference is now made to the following examples, which together with the above descriptions, illustrate the invention.

EXAMPLE 1

Figure 4:
FIG. 4 presents a part of an image including white and black pixels arranged in defined large areas (i.e., in patches), wherein white pixels within the dashed circle are attributed to a cluster.

With reference now to FIG. 4. Presented is a part of an image including white (i.e., RGB=white) pixels and black pixels (i.e., RGB=black) arranged in defined large areas (i.e., in patches). White pixels within the dashed circle are attributed to a cluster calculated according to as described above. The cluster of white pixels presented in FIG. 4 is directed at providing an example for a feature of measurement. Thus, for example, a feature of measurement may include selecting a number (e.g., five, a–e) of the white pixels from within the cluster for color determination by a spectrophotometer. The feature of measurement may also include information regarding the order in which the pixels are measured. Alternatively, the measurement may also be random and/or include a random number of white pixels from within the cluster. Furthermore, the feature of measurement may also include information regarding the value (i.e., intensity) of the color and the amount of tolerance (i.e., deviation) from that value which is still permitted. The value of color and tolerance may be calculated by performing measurements at various locations within the cluster (e.g., pixels a–e) as a reference and determining the mean value and the standard deviation.

EXAMPLE 2

Figure 5:
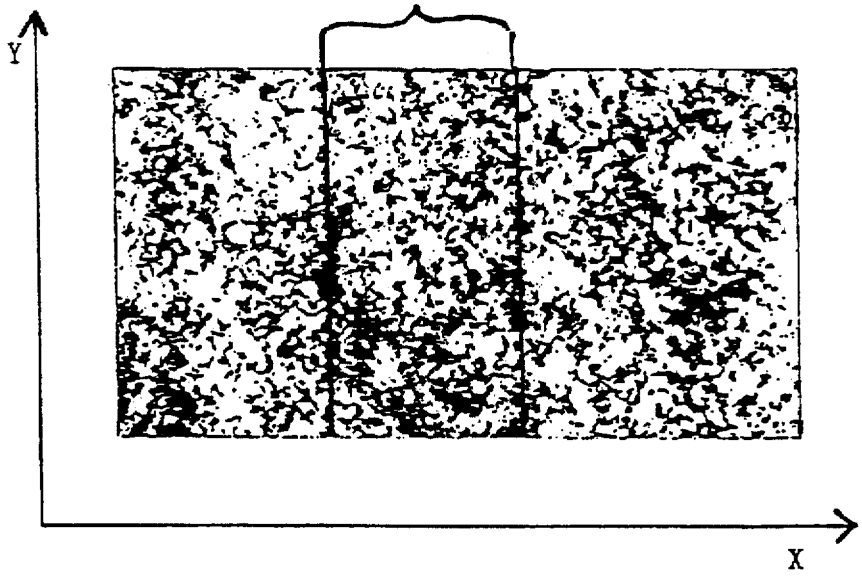
FIG. 5 presents a part of an image including white, gray and black pixels arranged in a random pattern characterized by absence of defined large patches, wherein black pixels within the vertical band are attributed to a cluster.

With reference now to FIG. 5. Presented is a part of an image including white (i.e., RGB=white) pixels, gray (i.e., RGB=gray) pixels and black pixels (i.e., RGB=black) arranged in a random pattern characterized by absence of defined large patches. In this case, black pixels within the vertical band are attributed to a cluster calculated according to as described above, wherein high allowable deviation in the first spatial dimension Y (i.e., $T_Y$ selected having a high value) and low allowable deviations in the second spatial dimension X (i.e., $T_X$ selected having a low value) and in the color dimensions R, G and B (i.e., $T_R$, $T_G$ and $T_B$ selected having low values). The mean color value and standard deviation are calculated for the pixels of the cluster, wherein the feature of measurement may include (i) grabbing the image by a CCD camera to obtain an RGB grabbed image, (ii) detecting within the band defined by the cluster all original pixels attributed to the cluster, these are pixels having an RGB color which is close to the mean calculated above as much as not more than three standard deviations, (iii) calculating the mean color value of thus identified pixels, ensuring for example that this mean value does not exceed half a standard deviation calculated for the cluster pixels. In case of a higher deviation, an alarm signal is to be actuated.

As can be learned from the above Examples 1 and 2, the feature of measurement according to the present invention, is a determination of a set of physical measurements and calculations to be later on performed. In other words, the feature of measurement is a set of instructions regarding the actual measurement of an image.

What is claimed is:

1. A method for evaluating a printing process, the method comprising the steps of:
   (a) calculating a multidimensional data representation of a reference image; and
   (b) clustering said multidimensional data representation into at least one cluster of data according to at least one multidimensional clustering algorithm, each of said at least one clusters of data being for determining at least one feature of measurement of said reference image, said at least one feature of measurement being for selecting at least one type of physical measurement to be performed on a printed image, said at least one type of physical measurement being for a color based control of the printing process of said printed image.
2. A method as in claim 1, further comprising the steps of:
   (c) performing said at least one type of physical measurement for obtaining at least one physical measure of said printed image; and
   (d) determining whether said at least one physical measure being within a predetermined range.
3. A method as in claim 2, further comprising the step of:
   (e) adjusting the printing process if said at least one physical measure is out of said predetermined range.

4. A method as in claim 2, farther comprising the step of:

(e) actuating an alarm signal if said at least one physical measure is out of said predetermined range.

5. A method as in claim 2, further comprising the step of:

(e) recording said physical measure for producing a report.

6. A method as in claim 2, wherein said at least one type of physical measurement is selected from the group consisting of a measurement for determining the presence and value of at least one color in at least one given location in said printed image and a measurement for determining at least one location of at least one given color in said printed image.

7. A method as in claim 1, wherein said reference image and said printed image are a single image.

8. A method as in claim 1, further comprising the step of:

(e) communicating said feature of measurement to a distant printing station.

9. A method as in claim 1, wherein said reference image is selected from the group consisting of a prepress digital image and an acquired image.

10. A method as in claim 1, wherein said multidimensional data representation is a multidimensional histogram.

11. A method as in claim 1, wherein said calculation of said multidimensional data representation is according to at least two dimensions, of which at least one is a spatial coordinate, and at least one is a color dimension of a color space.

12. A method as in claim 11, wherein said calculation of said multidimensional data representation is further according to a time dimension.

13. A method as in claim 1, wherein said calculation of said multidimensional data representation is according to at least two dimensions selected from the group consisting of a first spatial coordinate, a second spatial coordinate, an angle, a red color dimension, a green color dimension, a blue color dimension, a cyan color dimension, a magenta color dimension, a yellow color dimension, a black color dimension, an L* color dimension, an a* color dimension, a b* color dimension, an X color dimension, a Y color dimension, a Z color dimension, a L color dimension, a U color dimension, a V color dimension and a time dimension.

14. A method as in claim 13, wherein said at least two dimensions include at least one dimension of a spatial coordinate selected from said first and second spatial coordinates and at least one dimension selected from said color dimension.

15. A method as in claim 1, wherein said clustering of said at least one cluster of data is effected by at least one multidimensional clustering weighting function, each of said at least one multidimensional clustering weighting functions has a predetermined range in each of said dimensions, said clustering is according to at least one rule.

16. A method as in claim 1, wherein said at least one multidimensional clustering algorithm is selected from the group consisting of a simple cluster seeking algorithm, a maximin distance algorithm, a K-means algorithm and an isodata algorithm.

17. A method as in claim 1, wherein said at least one feature of measurement is selected from the group consisting of a measurement for determining the presence and value of at least one color in at least one given location in said reference image and a measurement for determining at least one location of at least one given color in said reference image.

18. A device for evaluating a printing process, the device comprising:

(a) calculating means for calculating a multidimensional data representation of a reference image; and (b) clustering means for clustering said multidimensional data representation into at least one cluster of data according to at least one multidimensional clustering algorithm, each of said at least one clusters of data being for determining at least one feature of measurement of said reference image, said at least one feature of measurement being for selecting at least one type of physical measurement to be performed on a printed image, said at least one type of physical measurement being for a color based control of the printing process of said printed image.

19. A device as in claim 18, further comprising:

(c) a measuring apparatus for performing said at least one type of physical measurement for obtaining at least one physical measure of said printed image and for determining whether said at least one physical measure being within a predetermined range.

20. A device as in claim 19, further comprising:

(d) a feedback system for adjusting the printing process if said at least one physical measure is out of said predetermined range.

21. A device as in claim 19, further comprising:

(d) an alarm system for actuating an alarm signal if said at least one physical measure is out of said predetermined range.

22. A device as in claim 19, further comprising:

(d) a recording system for recording said physical measure for producing a report.

23. A device as in claim 19, wherein said at least one type of physical measurement is selected from the group consisting of a measurement for determining the presence of at least one color in at least one given location in said printed image and a measurement for determining at least one location of at least one given color in said printed image.

24. A device as in claim 18, wherein said reference image and said printed image are a single image.

25. A device as in claim 18, further comprising:

(d) communication means for communicating said feature of measurement to a distant printing station.

26. A device as in claim 18, wherein said reference image is selected from the group consisting of a prepress digital image and an acquired image.

27. A device as in claim 18, wherein said multidimensional data representation is a multidimensional histogram.

28. A device as in claim 18, wherein said calculation of said multidimensional data representation is according to at least two dimensions, of which at least one is a spatial coordinate, and at least one is a color dimension of a color space.

29. A device as in claim 28, wherein said calculation of said multidimensional data representation is further according to a time dimension.

30. A device as in claim 18, wherein said calculation of said multidimensional data representation is according to at least two dimensions selected from the group consisting of a first spatial coordinate, a second spatial coordinate, an angle, a red color dimension, a green color dimension, a blue color dimension, a cyan color dimension, a magenta color dimension, a yellow color dimension, a black color dimension, an L* color dimension, an a* color dimension, a b* color dimension, an X color dimension, a Y color dimension, a Z color dimension and a time dimension.

31. A device as in claim 30, wherein said at least two dimensions include at least one dimension of a spatial coordinate selected from said first and second spatial coordinates and at least one dimension selected from said color dimension.

32. A device as in claim 18, wherein said clustering of said at least one cluster of data is effected by at least one multidimensional clustering weighting function, each of said at least one multidimensional clustering weighting functions has a predetermined range in each of said dimensions, said clustering is according to at least one rule.

33. A device as in claim 18, wherein said at least one multidimensional clustering algorithm is selected from the group consisting of a simple cluster seeking algorithm, a maximin distance algorithm, a K-means algorithm and an isodata algorithm.

34. A device as in claim 18, wherein said at least one feature of measurement is selected from the group consisting of a measurement for determining the presence and value of at least one color in at least one given location in said reference image and a measurement for determining at least one location of at least one given color in said reference image.

* * * * *

UNITED STATES PATENT AND TRADEMARK OFFICE

CERTIFICATE OF CORRECTION

PATENT NO. : 5,731,989

DATED : Mar. 24, 1998

INVENTOR(S) : Roy Tenny et al

It is certified that error appears in the above-identified patent and that said Letters Patent is hereby corrected as shown below:

On title page,

At [73] Assignee: - change "Advance" to "Advanced".

Signed and Sealed this

Sixth Day of October, 1998

Attest:

BRUCE LEHMAN

*Attesting Officer* *Commissioner of Patents and Trademarks*